US005104708A

United States Patent [19]

Murphy

[11] Patent Number: 5,104,708

[45] Date of Patent: Apr. 14, 1992

[54] WOOD PATCH

[75] Inventor: David L. Murphy, Prineville, Oreg.

[73] Assignee: Arthur H. Fitzgerald, Prineville, Oreg. ; a part interest

[21] Appl. No.: 497,892

[22] Filed: Mar. 23, 1990

Related U.S. Application Data

[62] Division of Ser. No. 412,020, Sep. 25, 1989, Pat. No. 4,949,767.

[51] Int. Cl.$^5$ ........ B32B 21/04; E04G 23/02

[52] U.S. Cl. ........ 428/63; 144/2 M; 156/98

[58] Field of Search ........ 144/2 M; 428/63; 156/98

[56] References Cited

U.S. PATENT DOCUMENTS

| | | | |
|---|---|---|---|
| 1,452,008 | 4/1923 | Volkman | 144/137 |
| 2,263,536 | 11/1941 | Dike | 144/2 M |
| 2,536,665 | 1/1951 | Skoog | 428/63 X |
| 2,583,396 | 1/1952 | Skoog | 428/63 X |
| 2,674,770 | 4/1954 | Bennett et al. | 144/2 M X |
| 4,949,767 | 8/1990 | Murphy | 144/39 X |

FOREIGN PATENT DOCUMENTS

| | | | |
|---|---|---|---|
| 2125799 | 5/1971 | Fed. Rep. of Germany | 428/63 |

*Primary Examiner*—Henry F. Epstein
*Attorney, Agent, or Firm*—John F. Ingman

[57] ABSTRACT

An improved wood patch, in combination with a slot formed in a blemished wooden surface, and apparatus and method of manufacture thereof. The improved wood patch has, where the wooden surface to be repaired is horizontal, three faces: a flat horizontal exterior face, a flat vertical interior face, and an angled arcuate interior face. The patch has both a larger vertical radius of curvature and a larger angle between the flat vertical interior face and the angled arcuate interior face than the slot. Apparatus for manufacture includes a router utilizing a double router bit having a straight cutting edge oriented perpendicular to the axis of rotation of the bit and an angled cutting edge oriented at an angle to the straight cutting edge. Both relative longitudinal and transverse movement between the wood stock and the double router bit are created by the router being installed on a pneumatically actuated pivoting platform attached to a carriage which is engaged to a longitudinal track, with the router having a cam follower which engages a cam having a series of lobes formed in the shape of the curved intersection of the flat interior face and the arcuate interior face of the wood patch. A series of curved scallop-like protrusions are created on the wood stock which protrusions are subsequently removed by a separate cutting blade, mounted on the carriage behind the double router bit. Utilizing the proper cam, an elongated patch may be formed for a longitudinal series of blemishes on a wooden surface.

6 Claims, 4 Drawing Sheets

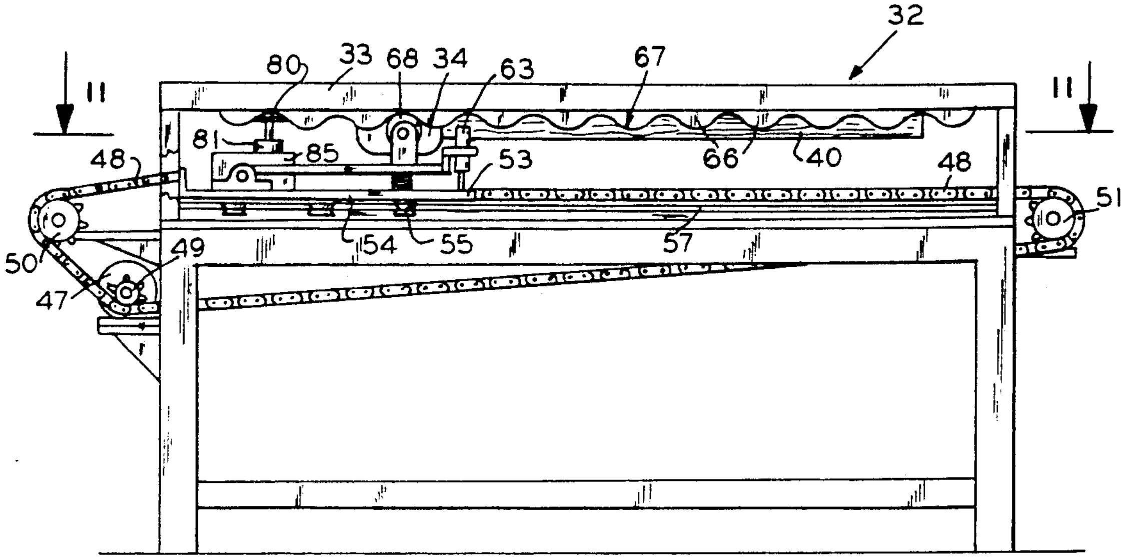
FIG. 9
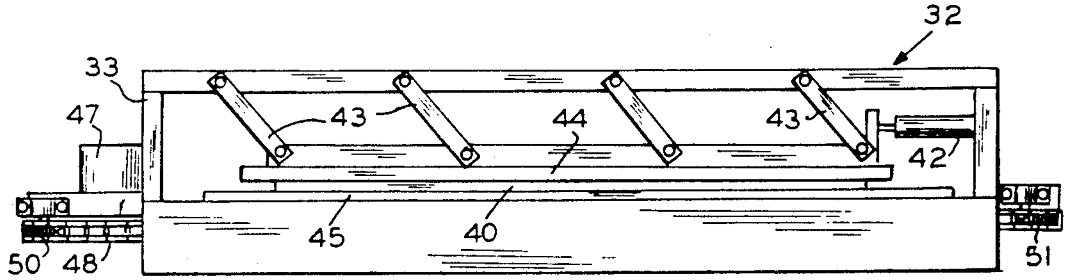
FIG. 10
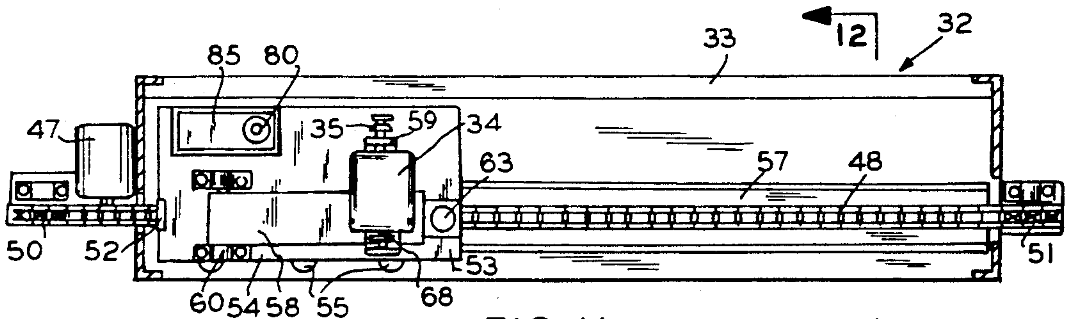
FIG. 11
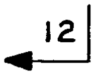

FIG.17
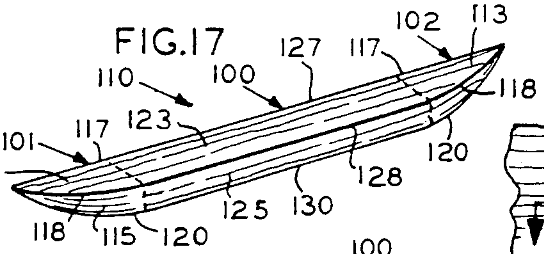
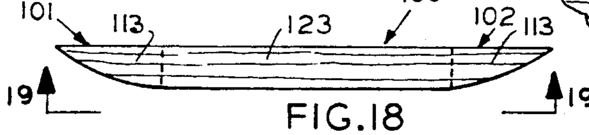
FIG.18
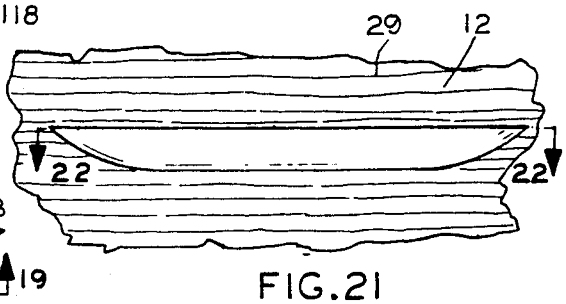
FIG.21
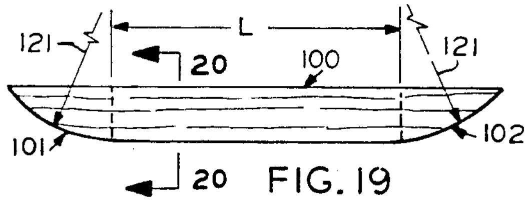
FIG.19
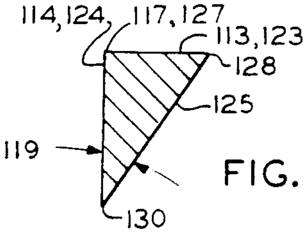
FIG.20
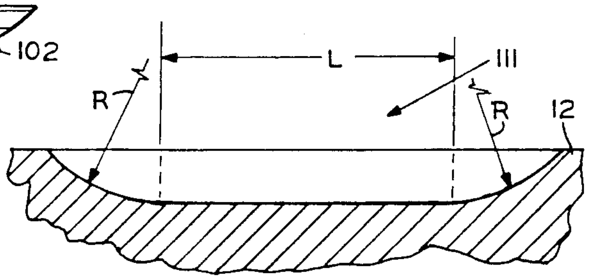
FIG.22
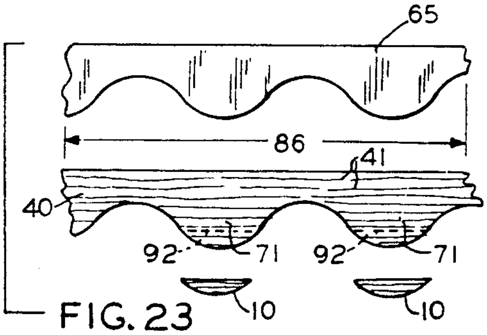
FIG.23
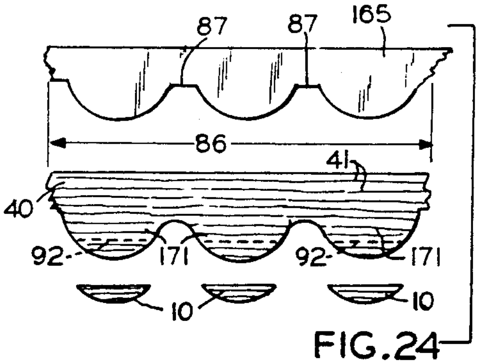
FIG.24
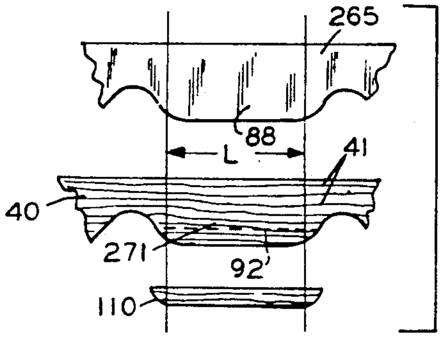
FIG.25

WOOD PATCH

This application is a division of co-pending application Ser. No. 07/412.020 now U.S. Pat. No. 4,949,767 filed on Sept. 25. 1989.

BACKGROUND OF THE INVENTION

1. Field of the Invention

This invention involves a wood patch for application on wooden surfaces where a blemish-free surface is desired, and, more particularly, a wood patch having expanded dimensions; and the apparatus and method utilized in manufacture thereof.

2. Description of the Prior Art

Certain wood products, such as moldings, door jams, window frames, furniture panels, and the like, desirably have a blemish free surface. When a blemish, such as a pitch pocket or small knot hole, is found on a surface during manufacture, a shaped patch-receiving slot is formed at the point of blemish and a wood patch, preformed to fit the slot, is inserted therein and glued in place. Conventionally, such wood patches are of a boat shape, dimensioned to match a hole left by the insertion of a pointed rotating millcutter blade a set distance without longitudinal movement. West German Patent No. 2,125,799, issued to Oertli & Co, Bulach, Switzerland, describes such a patch, and the apparatus and method for manufacture thereof.

A boat-shaped wood patch formed to exactly fit a patch-receiving slot has certain disadvantages. While one may design the manufacture of wood patches to slot dimensions, the boat shaped slots conventionally are formed by hand guided and operated saws which thus may produce slots which are larger than the preformed patches, leaving a gap between an edge of the patch and an edge of the slot. Such gaps may occur in over 50% of the patch applications, requiring filling or repatching.

The boat-shaped slots and patches conventionally are aligned to the extent possible with the grain of the wood surface being repaired. However, normally, neither curved edge of the conventional patch aligns with the grain of the wooden surface, thus producing, particularly with a clear finish, a quite visible patch.

What is needed is an improved wood patch, for use with a corresponding wood patch receiving slot, which insures a tight fit of the wood patch against the edges of the slot. Such a patch also should be shaped to more effectively meld in with the longitudinal grain of the wood surface to which it is applied. Additionally, such improved wood patch must be capable of efficient mass production.

SUMMARY OF THE INVENTION

The present invention provides an improved wood patch, and apparatus and method of manufacture thereof, to meet the aforementioned need.

The improved wood patch has, where the wooden surface to be repaired is horizontal, three faces: a flat horizontal exterior face, a flat vertical interior face, and an angled arcuate interior face. This wood patch is dimensioned to be somewhat larger than a correspondingly shaped slot formed in the wooden surface, such larger size insuring a tight fit. In particular, a somewhat larger vertical radius of curvature causes the wood patch, when forced into the slot, to grip tightly at the ends of the patch, while an increase in the angle between the flat vertical interior face and the angled arcuate interior face presses the curved and straight interior face edges of the patch tightly against the edges of the slot. Furthermore, the application of the straight edge of the longitudinally grained wood patch parallel to the grain in the blemished wooded surface makes that straight edge less detectable, thereby reducing the visibility of the applied patch.

A preferred apparatus for the manufacture of the above described wood patch includes a router utilizing a double router bit having two types of cutting edges: a straight cutting edge oriented perpendicular to the axis of rotation of the bit and an angled cutting edge oriented at an angle to the straight cutting edge. A clamp is provided to secure a piece of wood stock. Means are provided for creating both relative longitudinal and transverse movement between the piece of wood stock and the double router bit. The preferred means of relative longitudinal movement involves a fixed clamp and thereby stationary wood stock, with longitudinal movement being imparted to the router and double router bit by a chain and sprocket arrangement powered by a reversible motor, with the router installed on a pivoting platform attached to a carriage which is engaged to a longitudinal track. The preferred means of transverse movement includes the use of a stationary cam, having a series of lobes formed in the shape of the curved intersection of the flat interior face and the arcuate interior face of the wood patch, as viewed normal to the flat interior face. A series of lobes allows a plurality of wood patches to be created as a result of a single pass by the cutting edges over the wood stock. A cam follower is attached to the router, opposing the double router bit. A combination of springs and an actuatable pneumatic cylinder, located between the pivotal platform and the carriage, applies upward pressure on the router containing platform, so that the double route bit engages the stationary wooden stock and the cam follower engages the cam. Upon longitudinal movement of the router, the cam follower follows the shape of the cam, and the double router bit produces a series of curved scallop-like protrusions on the wood stock. The protrusions have two separate faces caused by the straight cutting edge and the angled cutting edge of the double router bit, which correspond respectively to the flat vertical interior face and the angled arcuate interior face of the wood patch.

The curved scallop-like protrusions thus formed on the wood stock are subsequently removed by a separate cutting blade, also mounted on the router carriage, which follows the double router bit. This separate cutting lade, preferably a thin rotary blade, cuts off the protrusions at a right angle to the straight cutting edge of the double router bit. Such cut forms the flat horizontal exterior face at right angles to the flat vertical interior face, which completes manufacture of the wood patch.

The double router bit may include an additional edged element, termed a chipper, which is located between the two cutting edges at their projected intersection. The chipper is useful in kicking out wood chips formed by the cutting edges, and also in smoothing the edge of the wood patch created by the other two cutting edges.

A variety of cam shapes may be used. In particular, a cam having a lobe or scallop with an elongated central portion and curved ends will produce a patch of similar profile, thereby creating an elongated patch for use with a corresponding elongated slot for removing a longitudinal series of blemishes in the wooden surface of concern.

BRIEF DESCRIPTION OF THE DRAWINGS

FIG. 9 illustrates a side view of the preferred apparatus used to manufacture the wood patches.

FIG. 10 illustrates a top view of the apparatus of FIG. 9.

FIG. 11 illustrates a top sectional view of the apparatus, as seen at line 11—11 of FIG. 9.

FIG. 17 illustrates a perspective view of an alternative elongated wood patch.

FIG. 18 illustrates a top plan view of the wood patch of FIG. 17.

FIG. 19 illustrates a side elevation view of the elongated wood patch as seen at line 19—19 of FIG. 18.

FIG. 20 illustrates a sectional view of the elongated wood patch as seen at line 20—20 of FIG. 18.

FIG. 21 illustrates a top plan view of the slot for the elongated wood patch of FIG. 17, as created in a blemished wooden surface.

FIG. 22 illustrates a cross sectional elevation view of the slot as seen at line 22—22 of FIG. 21.

FIG. 23 schematically illustrates a symmetrical cam design, the resulting wooden stock form, and wood patches produced therefrom.

FIG. 24 schematically illustrates an alternative cam design, the resulting wooden stock form, and wood patches produced therefrom.

FIG. 25 schematically illustrates an alternative cam design for elongated wood patches, the resulting wooden stock form, and a wood patch produced therefrom.

DESCRIPTION OF THE PREFERRED EMBODIMENT

Figure 1:
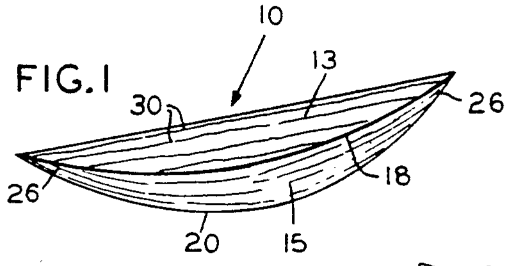
FIG. 1 illustrates a perspective view of the wood patch of the invention.
Figure 2:
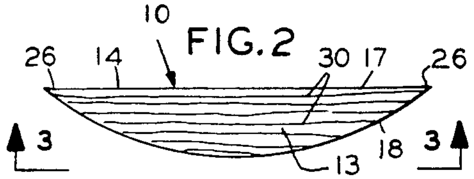
FIG. 2 illustrates a top plan view of the wood patch of FIG. 1.
Figure 3:
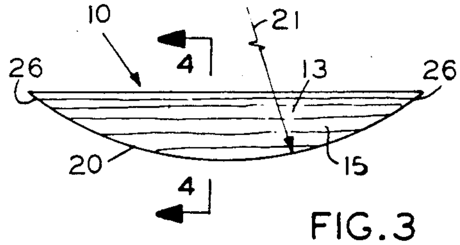
FIG. 3 illustrates a side elevation view of the wood patch as seen at line 3—3 of FIG. 2.

Referring now to the drawings, there is shown in FIGS. 1 through 4 various views of the preferred wood patch 10. The wood patch 10 has three faces, which, when oriented so as to fill a slot 11 formed in a blemished wooden surface 12 where the wooden surface 12 is horizontal, are (1) a flat horizontal exterior face 13, (2) a flat vertical interior face 14, and (3) an angled arcuate interior face 15. The flat horizontal exterior face 13 intersects with the flat interior vertical face 14 at a right angle 16 forming an edge 17 as a straight line, and with the angled arcuate interior face 15 forming a curved edge 18. The flat vertical interior face 14 intersects the angles arcuate interior face 15 at acute angle 19, measured normally to the flat vertical interior face 14, forming a curved lower edge 20 having a radius 21. The angle 19 and the radius 21 are especially important to the invention, and are descried in greater detail subsequently.

Figure 5:
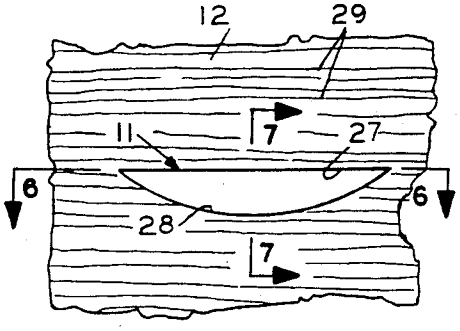
FIG. 5 illustrates a top plan view of a slot for the wood patch, as created in a blemished wooden surface.
Figure 6:
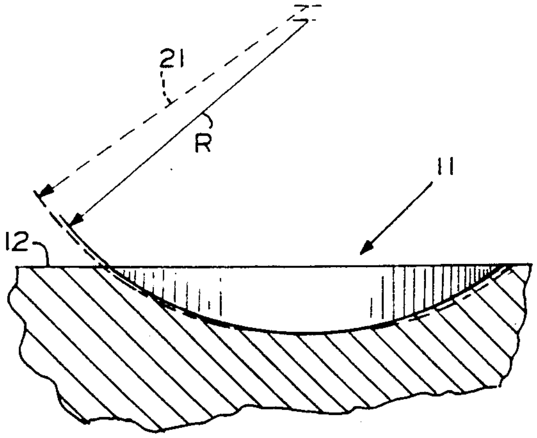
FIG. 6 illustrates a cross sectional side elevation view of the slot, as seen at line 6—6 of FIG. 5, as created by the blade of FIG. 7, showing the blade radius R, and the corresponding patch radius.
Figure 7:
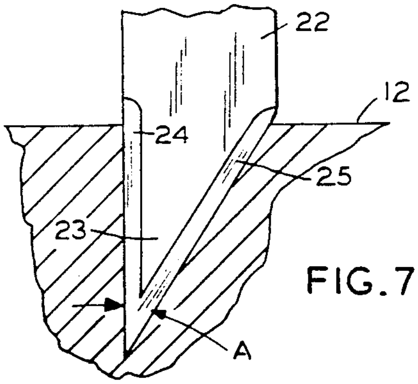
FIG. 7 illustrates a cross sectional view of the slot as seen at lines 7—7 of FIG. 5, and a portion of a blade cutting the slot.
Figure 4:
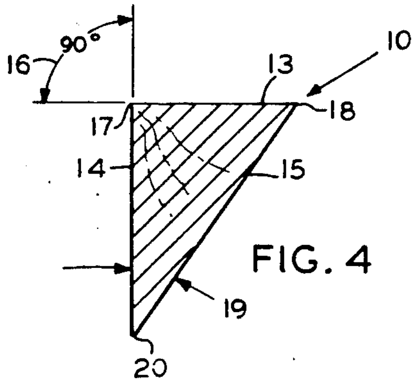
FIG. 4 illustrates a sectional view of the wood patch, as seen at line 4—4 of FIG. 3.
Figure 8:
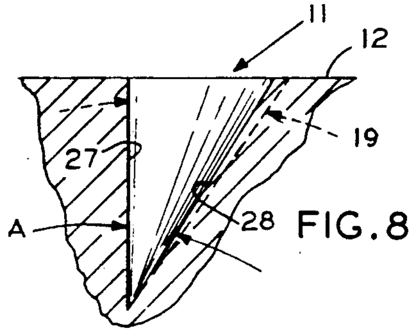
FIG. 8 illustrates the cross sectional view of FIG. 7, showing the blade angle A and corresponding wood patch angle.

FIG. 5 through 8 provide views of the slot 11 into which the wood patch 10 is inserted. FIG. 5 illustrates a plan view of horizontal blemished wooden surface 12 in which a wood patch receiving slot 11 has been formed. The slot 11 may be formed by a vertically rotating blade 22 of radius R having a cutting tooth 23, as seen in FIG. 6, with a vertical cutting edge 24 and an angled cutting edge 25, an angle A being enclosed between cutting edges 24 and 25.

The wood patch 10 has a radius 21 which is somewhat larger than radius R of slot 11 and an angle 19 which is somewhat larger than angle A of slot 11. Such size of radius 21 and angle 19 assures a proper fit of the wood patch 10 in the slot 11 without gaps between the flat horizontal exterior face 13 and the wooden surface 12 outside of the slot 11. In particular, the larger radius 21 of the curvature of the lower edge 20 of the wood patch 10, compared as a dashed line in FIG. 6, causes the wood patch 10, when pressed into the slot 11, to grip tightly at the ends 26 of the wood patch 10, while the increase in the angle 19, compared as a dashed line in FIG. 8, between the flat vertical interior face 14 and the angled arcuate interior face 15 presses these two interior faces 14 and 15 tightly against the interior faces 27 and 28 of the slot 11. Where the slot 11 is formed by a commonly available rotating blade 22 having a radius R of 1 15/16-inches, a preferred radius 21 of the wood patch 10 is 1/16-inch greater, or 2-inches. Similarly, where the angle A of the slot-making saw blade 22 is 35-degrees, a preferred angle 19 is 35½-degrees. It has been found that the wood patch 10 with this ½-degree increase in angle 19 works well for slots 11 having an angle A of 35 degrees to 45 degrees.

Preferably the slot 11 formed in a wooden surface 12 is cut parallel to the flow of the grain 29, and the wood patch 10 is manufactured, as described subsequently, with the flat vertical interior 14, and thus edge 17, parallel with the grain 30 of the wood patch 10. When the slot 11 and wood patch 10 are so formed, the edge 17 of the patch 10 normally blends quite well with the grain 29 of the wooden surface 12 being repaired, thereby reducing the visibility of the applied wood patch 10 on the wooden surface 12 and improving the appearance of the product.

The slot 11, as indicated above, may be formed by a vertically rotating blade 22 of radius R, being inserted into the wooden surface 12 and subsequently removed, without longitudinal movement. An elongated slot 111 may be formed by longitudinal movement of the blade 22 within the slot a distance L. as seen in FIG. 22. For the filling of an elongated slot 111, an elongated patch 110, as seen in FIGS. 17 through 20, may be created, having a center section 100 with a length L and end sections 101 and 102; the end sections 101 and 102 being of a shape resulting from a transverse bisection of a wood patch 10. The end sections 101 and 102 of wood patch 110 have edges 117, 118, 120 and faces 113, 114, 115 which correspond to the edges 17, 18, 20 and faces 13, 14, 15 of the wood patch 10. The center section 100 has straight edges 127, 128, 130 and flat faces 123, 124, 125 which are extensions, respectively, of the edges 117, 118, 120 and faces 113, 114, 115 of the end sections 101 and 102. The angle 119 of the elongated patch 110 and the radius 121 of end sections 101 and 102 are the same as angle 19 and radius 21 of the basic wood patch 10.

FIGS. 8 through 16 illustrate apparatus 32 utilized in the manufacture of the wood patch 10. A framework 33 is used to support the various components at a convenient height. The apparatus 32 includes a conventional router 34, electrically powered, to which is attached a double router bit 35. The double router bit 35, subsequently described further, has two cutting edges, a first, straight cutting edge 36 oriented perpendicular to the axis of rotation 37 of the double router bit 35, and a second, angled cutting edge 38 oriented at an angle 74 to the first straight cutting edge 36, corresponding to the angle 19 of the wood patch 10 described above.

A clamp 39, as best seen in FIG. 10, is used to secure an elongated piece of wood stock 40, preferably with its grain 41 oriented longitudinally. A preferred clamp 39 is pneumatically powered, as by air cylinder 42, where expansion of the air cylinder 42 pivots clamping arms 43 and the clamping surface 44 toward clamping surface 45, securing the wood stock 40 therebetween with a lower portion 46 extending downwards.

Figure 12:
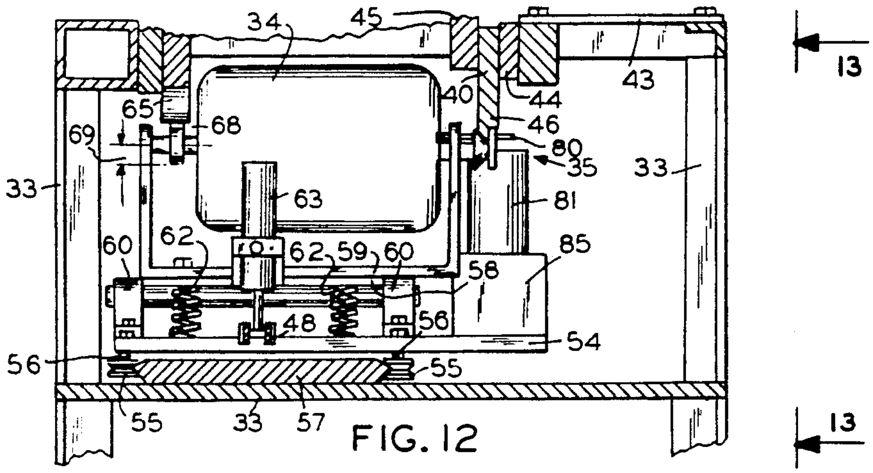
FIG. 12 illustrates an enlarged end sectional view of the apparatus, as seen at line 12—12 of FIG. 11.
Figure 13:
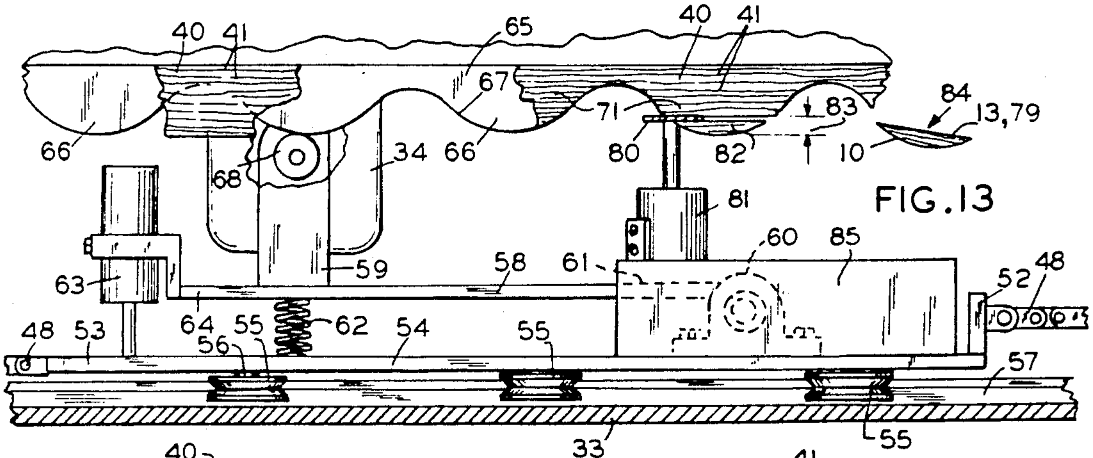
FIG. 13 illustrates an enlarged partial side view of the apparatus, as seen at line 13—13 of FIG. 12.

A combination of both longitudinal and transverse movement between the piece of wood stock 40 and the router 34 is utilized to form the wood patch 10. While such relative movement can be created by holding either the wood stock 40 or the router 34 fixed while moving the other, or even causing both to move simultaneously, as will be appreciated by those skilled in the art, the illustrated preferred embodiment utilizes a fixed clamp 39 position and therefore a stationary piece of wood stock 40, with movement imparted to the router 34 and thus the double router bit 35. In the preferred embodiment the router 34 moves longitudinally, that is, parallel to the length of the wood stock 40 within the clamp 39, such movement being created by a reversable motor 47 driving a chain 48 by sprocket 49, the chain 48 being routed via sprockets 50 and 51 so as to connect on both ends 52 and 53 of a carriage 54. The carriage 54 rides on a plurality of spaced, V-shaped horizontal rollers 55 which extend downwards on stub shafts 56 to engage a shaped horizontal rail 57 secured to the framework 33, as best seen in FIGS. 12 and 13. The router 34 thus is moved longitudinally by action of the motor 47 on the carriage 54.

A pivoting platform 58, upon which the router 34 is secured by support member 59, is attached to the carriage 54 by means of a hinge connection 60, e.g. pillow block as illustrated, at one end 61 of the platform 58. The platform 58 is resiliently supported above the carriage 54 by compression springs 62 positioned between the carriage 54 and the platform 58. An expandable pneumatic cylinder 63, also positioned between the carriage 54 and the platform 58, at end 64, provides actuatable means for additional vertical movement of the platform 58 and router 34, such vertical movement allowing the double router bit 35 to engage with the lower portion 46 of the wood stock 40.

A fixed cam 65 is attached to the framework 33 as illustrated. The cam 65 may have but a single lobe 66, but preferably, for the production of multiple wood patches 10 from a single run of the router 34, a plurality of lobes 66 are longitudinally spaced parallel to the orientation of the wood stock 40 and to the movement of the router 34 along the horizontal rail 57, with each lobe 66 corresponding to the production of a wood patch 10. In the apparatus 32 illustrated in FIG. 9, twelve lobes 66 or more may be provided on the cam 65. Where one is desirous of producing a wood patch 10 with edge 20 as described above, having a radius 21 of two inches, it may be convenient, although not necessary, for the lobes 66 to have the same shape, with a radius 67 of two inches. A rotating cam follower 68 is attached to the router 34, opposing the double router bit 35 as illustrated, which has the same radius 69 as the inner cut radius 70 of the double router bit 35. Thus, with the pneumatic cylinder 63 pressurized to raise the router 34 and double router bit 35, and as the router 34 moves along the rail 57, the cam follower 68 will longitudinally follow the cam 65 and thus impart a cyclical up and down, transverse motion to the double router bit 35, thereby creating a scallop-like series of protrusions 71 on the wood stock 40.

Figure 14:
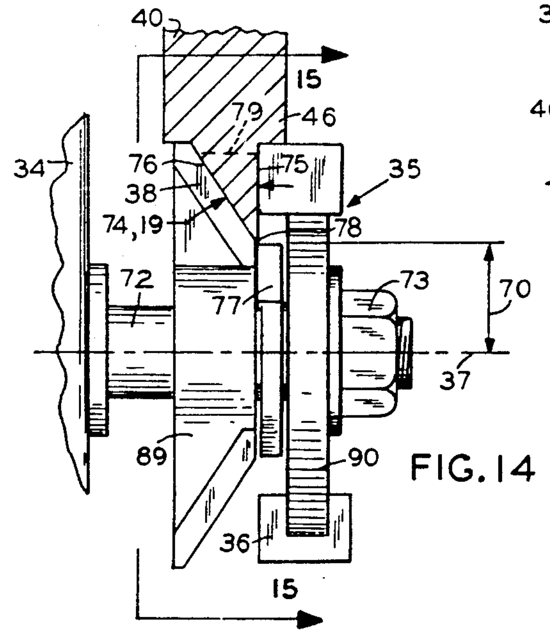
FIG. 14 illustrates a side elevation view of the double router bit of the apparatus.
Figure 15:
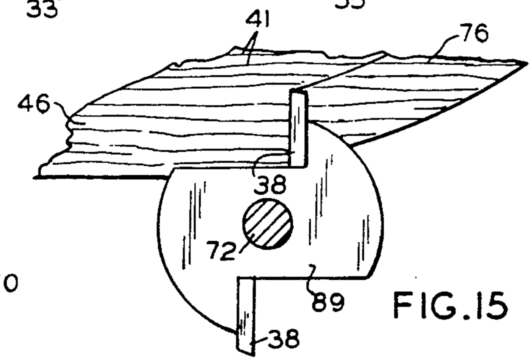
FIG. 15 illustrates a back elevation view of a preferred double router bit as seen at line 15—15 of FIG. 14.
Figure 16:
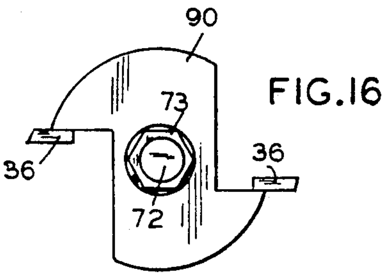
FIG. 16 illustrates a front elevation view of the double router bit of FIG. 15.

The double router bit 35 is best seen in the enlarged views of FIGS. 14, 15 and 16. The double router bit 35 is attached to rotating shaft 72 of the router 34 in a conventional manner, as by nut 73. Two principal cutting edges are used, an angled cutting edge 38, mounted on disc 89, and a vertical cutting edge 36, mounted on disc 90, with the cutting edges 36 and 38 offset as illustrated. In a preferred double router bit 35, as seen in FIGS. 15 and 16, two angled cutting edges 38 and two vertical cutting edges 36 are utilized, each rotationally offset from the other by 90 degrees. The angle 74 between the intersection of the paths of the cutting edges 36 and 38 corresponds to the angle of the wood patch 10 described above, so that the vertical surface 75 produced thus corresponds to the flat vertical interior face 14 while the angled surface 76 cut by the blade 38 corresponds to the angled arcuate interior face 15 of the wood patch 10. It is preferred, but not necessary, that an additional edged member, termed a chipper 77, be installed between disc 89 and disc 90 at a position corresponding to the intersection of the cutting edges 36 and 38, for the dual purpose of kicking out wood chips (not shown) produced by the action of the blades 36 and 38 on the wood stock 40, and in addition, to smooth out the edge 78, corresponding to the edge 20 of the wood patch 10.

Thus, the longitudinal and transverse movement of the double router bit 35 relative to the wood stock 40 having created a scallop-like series of protrusions 71 on the wood stock 40, which embody a vertical face 75, an angled face 76, and an included angle 74 which correspond to the flat vertical interior face 14, the angled arcuate interior face 15, and the included angle 19, respectively, there remains, in the manufacture of the wood patch 10, to create a horizontal face 79 corresponding to the flat horizontal exterior face 13 of the wood patch 10. This is accomplished by a horizontally cutting blade, preferably a thin rotating blade 80 powered by a small motor 81, which motor 81 and horizontal rotating blade 80 are attached to the router carriage 54 so as to follow the double router bit 35 on each longitudinal pass. The horizontal rotating blade 80 cuts off a lower portion 82 of the scallop-like protrusions 71 at a depth 83 so as to create the flat horizontal exterior face 13 and a completed wood patch 10. The completed wood patch 10, thus freed from the wood stock 40, will drop, as seen at 84, into a collecting tray 85 positioned longitudinally on the carriage 54 beneath the cutting path of the blades 36, 38, and 80.

While the method of manufacture of the desired wood patch 10 using the above described apparatus 32 may be clear, a step-by-step description is provided.

The method for the manufacture of wood patches includes the following steps:

a. clamping a piece of wood stock within a clamp 39;

b. engaging a rotating double router bit 35, having a straight cutting edge 36, and an angled cutting edge 38, against the clamped piece of wood stock 40;

c. moving the rotating double router bit 35 and clamped piece of wood stock 40 longitudinally with respect to each other; while also d. moving the double router bit 35 and clamped piece of wood stock 40 transversely with respect to each other;

e. forming by said relative longitudinal and transverse movement between the double router bit 35 and clamped piece of wood stock 40, scallop-like arcuate protrusions 71, on the piece of wood stock 40, having a vertical flat face 75 created by the straight cutting edge 36 and an angled arcuate face 76 created by the angled cutting edge 38, which faces 75 and 76 intersect at an angle 74, formed between the straight cutting edge 36 and the angled cutting edge 38 as measured in a plane normal to the vertical flat face 75;

f. cutting the protrusion 71 from the wood stock 40 by longitudinal movement between a horizontal cutting blade 80 which is oriented perpendicular to the vertical flat face 75 cut by the straight cutting edge 36 of the double router bit 35 on the wood stock 40, such cutting forming a horizontal flat face 79 perpendicular to the vertical flat face 75, which horizontal flat face 79 also intersects the flat angled arcuate face 76, thereby producing the desired wood patch 10;

g. adjusting downward the position of the piece of wood stock 40 in the clamp; and h. repeating steps b through g above, as desired, until the piece of wood stock is depleted.

Finally, it should be noted that in the present invention, the size and shape of the cam 65 will be determative of the wood patch 10. Illustrated in FIGS. 23, 24, and 25, there are shown various shapes of cams 65, 165, and 265, the resulting protrusions 71, 171, and 271 on the wood stock 40 after cutting by the double router bit 35, and finally after cutting by blade 80, at dashed line 92, the wood patches 10 or 110 which are produced. FIG. 23 illustrates a cam 65 which is shaped in a symmetrical pattern which produces, from a length 86 of wood stock 40, two wood patches 10. FIG. 24 illustrates a more efficient cam 165, which is asymmetrical, the unused upper portion of the symmetrical oscillations being eliminated and replaced by a shorter bridge element 87. As a result, with the cam 165 of FIG. 24, an illustrated three wood patches 10 are produced from the length 86 of wood stock 40, which produced only two wood patches 10 using cam 65. FIG. 25 illustrates a cam 265 which produces an elongated wood patch 110, as described above and shown in FIG. 17. In this cam 265, a horizontal section 88 of length L extends the lower portion of the cam 265 so as to produce a wood patch 110 which has a protrusion 271 with a similar longitudinal extension of length L. As indicated previously, such elongated patches 110 are useful in eliminating a longitudinal series of blemishes in the wooden surface 12 of concern.

It is thought that the wood patch, and apparatus and method of manufacture thereof, of the present invention and their many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A wood patch, in combination with a slot formed in a wood surface, where, when the wooden surface is horizontal, the slot includes a flat vertical wall, having a lower edge of radius R, and an angled arcuate wall, with the angled arcuate wall intersecting the lower edge of the flat vertical wall at angle A measured in a plane perpendicular to the flat vertical wall, said wood patch comprising:

a. a flat horizontal face;

b. a flat vertical face; and c. an angled arcuate face;

d. said flat horizontal face intersecting said flat vertical face at a right angle, the intersection forming a straight edge; and e. said flat vertical face intersecting said angled arcuate face at an angle, measured in a plane perpendicular to the flat vertical face, which is larger than angle A; the intersection of the flat vertical face and the angled arcuate face forming a curved line having a radius, measured in the plane of the flat vertical face, which is larger than radius R.

2. The wood patch, as recited in claim 1, wherein the angle of the intersection between the flat vertical face and the angled arcuate face is one-half degree larger than angle A.

3. The wood patch, as recited in claim 1, wherein said radius of the line of intersection between the flat vertical surface and the angled arcuate surface is $\frac{1}{16}$-inch larger than radius R.

4. The wood patch, as recited in claim 2, wherein the angle between the flat vertical face and the angled arcuate face is within a range of 35- degrees to 45- degrees.

5. The wood patch, as recited in claim 3, where said radius of the line of intersection between the flat vertical surface and the angled arcuate surface is 2 1/16-inches.

6. An elongated wood patch, in combination with an elongated slot formed in a wooden surface, where, when the wooden surface is horizontal, the slot is formed of: a vertical wall including, in longitudinal sequence, a first end section having a lower edge of radius R, a middle section of length L having as straight lower edge, and a second end section also having a lower edge radius R, where the lower edges of the first and second edge sections are formed tangential to the lower edge of the middle section; and an angled wall which intersects the lower edge of the vertical wall at an angle A measured in a plane perpendicular to the vertical wall, said angled wall including, in longitudinal sequence, an arcuate first end section, a flat middle section of length L, and an arcuate second end section; said elongated wood patch comprising:

a. two end sections, each having
   (1) a flat horizontal face;
   (2) a flat vertical face; and
   (3) an angled arcuate face;
   (4) said flat horizontal face intersecting said flat vertical face at a right angle, the intersection forming a straight edge; and
   (5) said flat vertical face intersecting said angled arcuate face at an angle, measured perpendicular to the plane of the flat vertical face, which is greater than angle A; the intersection of the flat vertical face and the angled arcuate face forming a curved line having a radius, measured in the plane of the flat vertical face, which is larger than radius R; and b. a center section of uniform triangular cross section, abutted on each opposing end by one of said end sections to monolithically form an elongated wood patch, said triangular cross section having:
   (1) a flat horizontal face of length L to which said flat horizontal faces of said end sections opposingly abut;
   (2) a flat vertical face of length L to which said flat vertical faces of said end sections opposingly abut; and
   (3) an angled flat face of length L to which said angled arcuate faces of said end sections opposingly and tangentially abut.

* * * * *